United States Patent [19]

Suga et al.

[11] Patent Number: 5,157,498
[45] Date of Patent: Oct. 20, 1992

[54] IMAGE SENSING DEVICE WITH NON-LINEAR CONVERTING MEANS

[75] Inventors: Akira Suga; Kan Takaiwa, both of Tokyo, Japan

[73] Assignee: Canon Kabushiki Kaisha, Tokyo, Japan

[21] Appl. No.: 839,669

[22] Filed: Feb. 19, 1992

Related U.S. Application Data

[60] Continuation of Ser. No. 554,746, Jul. 18, 1990, abandoned, which is a division of Ser. No. 453,213, Dec. 13, 1989, Pat. No. 4,963,980, which is a continuation of Ser. No. 151,573, Feb. 2, 1988, abandoned.

[30] Foreign Application Priority Data

Feb. 2, 1987 [JP] Japan .............................. 62-024624
Feb. 2, 1987 [JP] Japan .............................. 62-024625

[51] Int. Cl.⁵ .............................................. H04N 5/335
[52] U.S. Cl. ................................. 358/209; 358/213.19; 358/213.11; 358/213.22
[58] Field of Search ............... 358/209, 213.11, 213.19, 358/213.22

[56] References Cited

U.S. PATENT DOCUMENTS

| | | | |
|---|---|---|---|
| 4,603,354 | 7/1986 | Hashimoto | 358/213.13 |
| 4,750,041 | 6/1988 | Vogel | 358/213.22 |
| 4,774,585 | 9/1988 | Suga | 358/213.19 |
| 4,821,105 | 4/1989 | Suga | 358/213.31 |
| 4,847,686 | 7/1989 | Ploix | 358/213.28 |
| 4,875,101 | 10/1989 | Endo | 358/213.19 |

*Primary Examiner*—James J. Groody
*Assistant Examiner*—Sherrie Hsia
*Attorney, Agent, or Firm*—Robin, Blecker, Daley & Driscoll

[57] ABSTRACT

An image sensing device is provided with a switching circuit for a selection between a field reading mode and a frame reading mode in reading signals formed at picture elements of an image sensor; and an overflow control circuit for controlling and changing the overflow level of each of the picture elements from one level over to another in response to the selecting action of the switching circuit. The device is arranged to store, at an EEPROM, data relative to the overflow levels of each of the picture elements differently set for the field and frame reading modes.

15 Claims, 17 Drawing Sheets

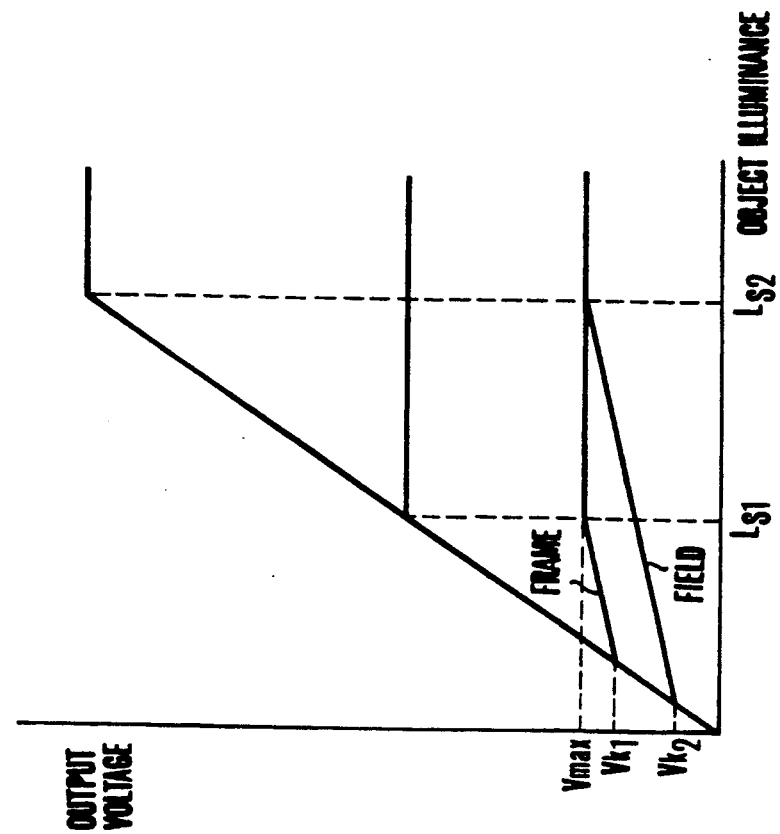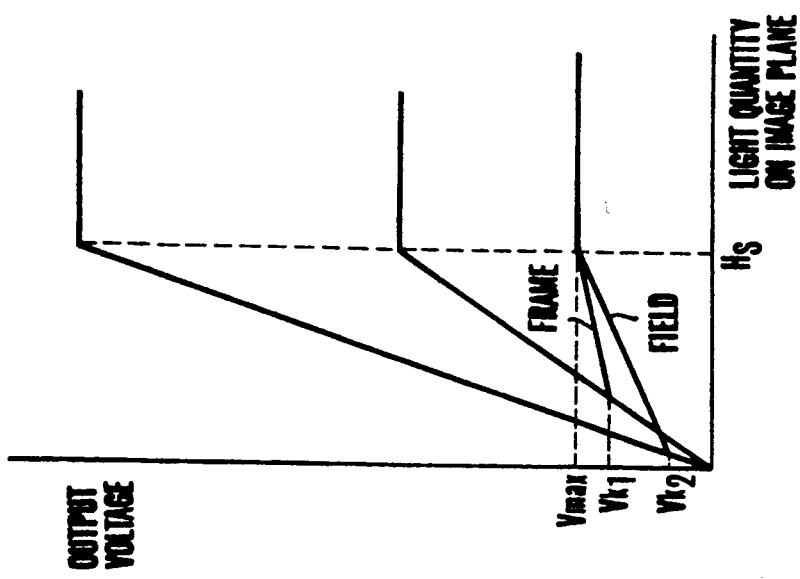

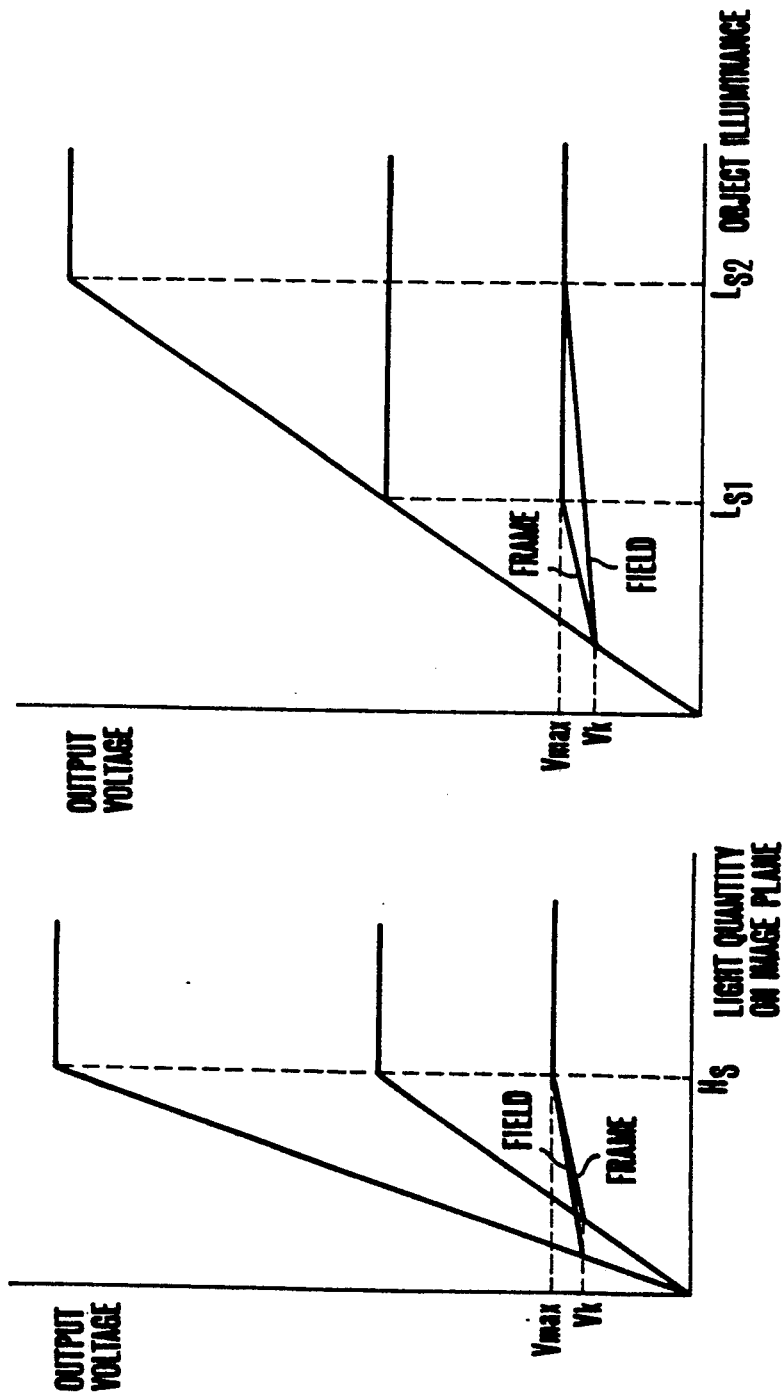

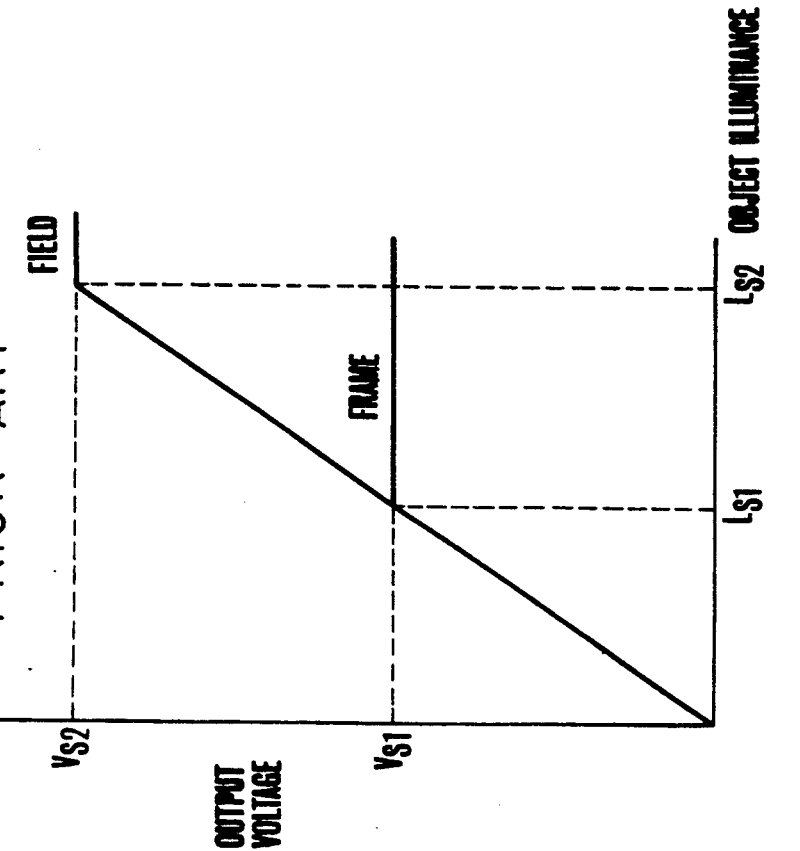
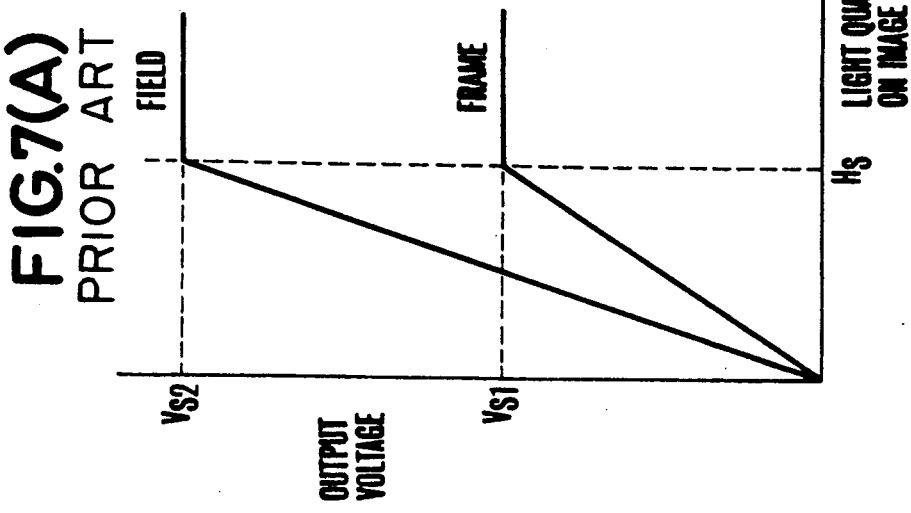

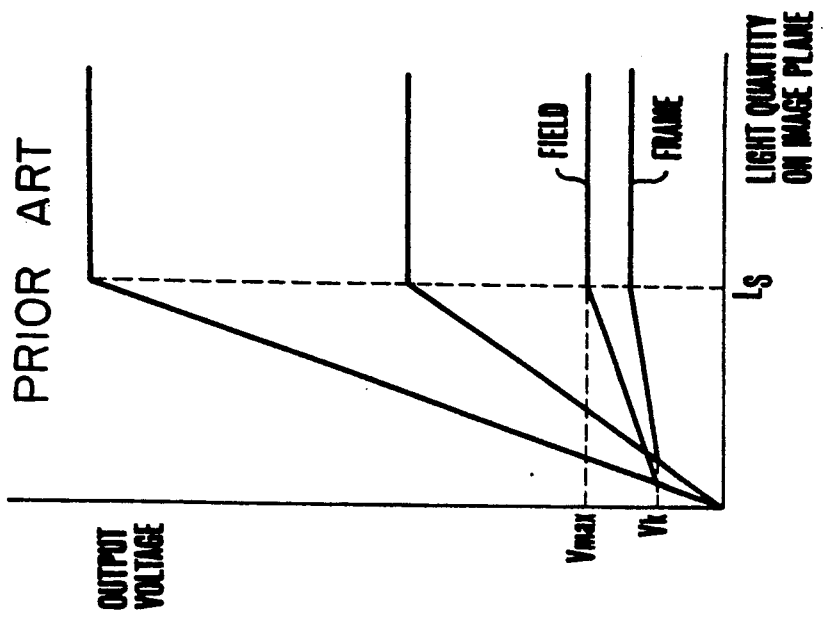
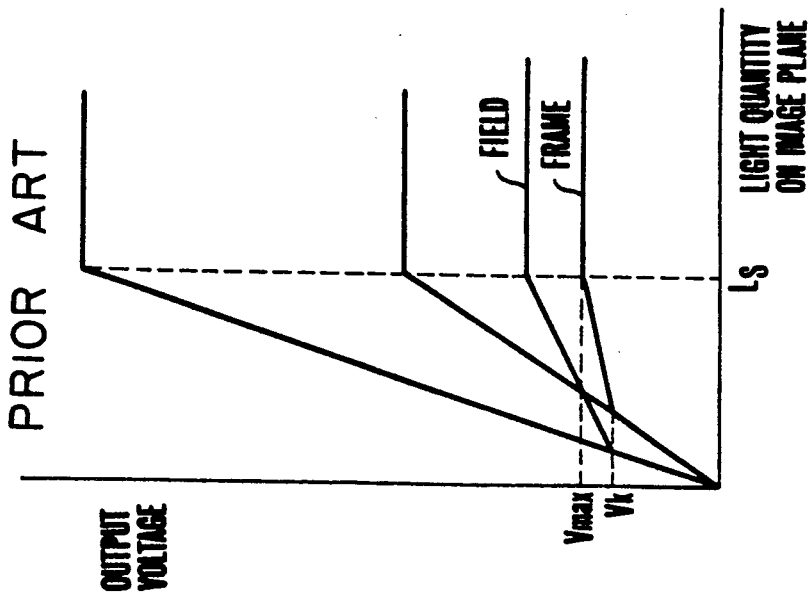

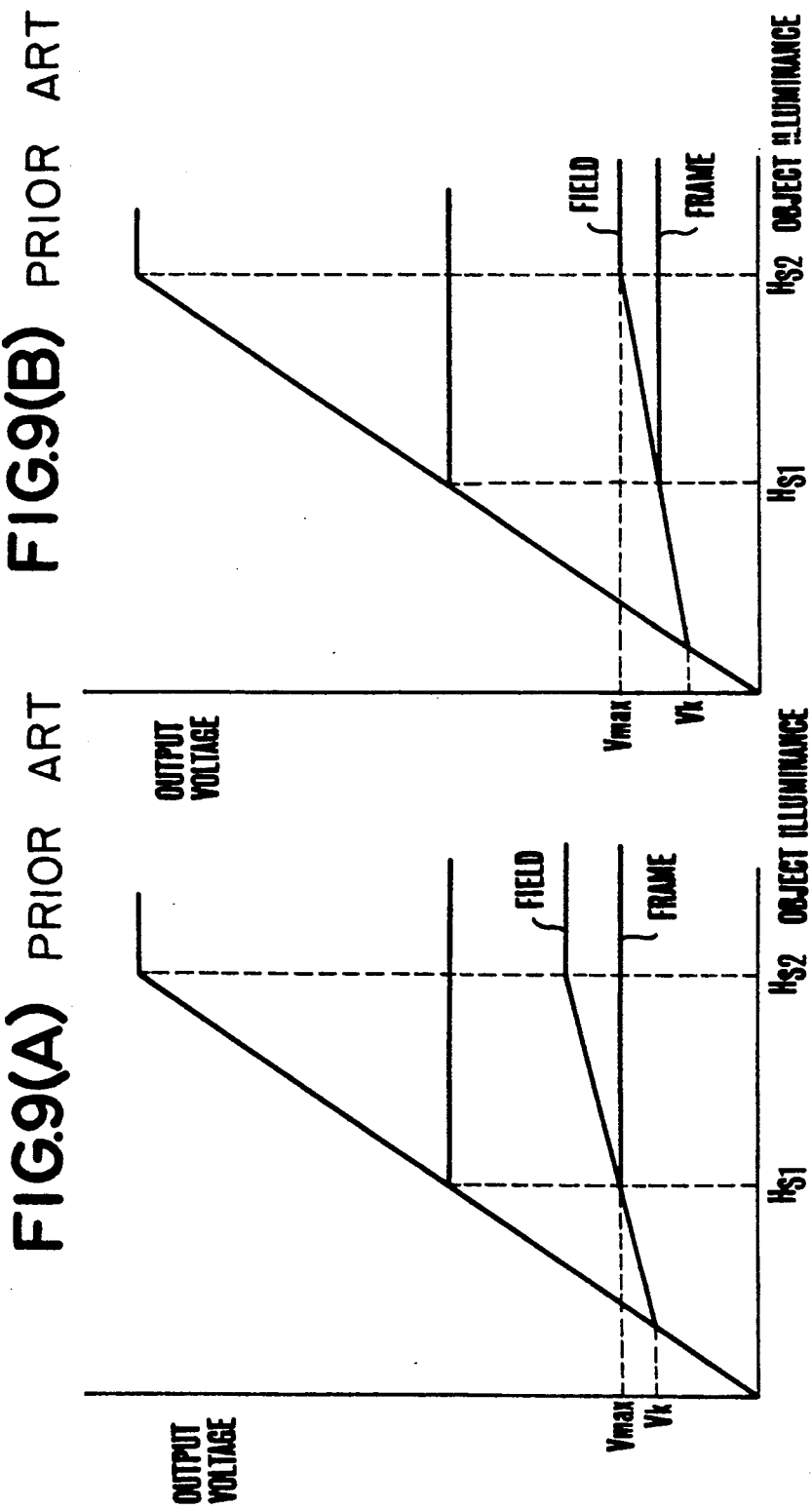

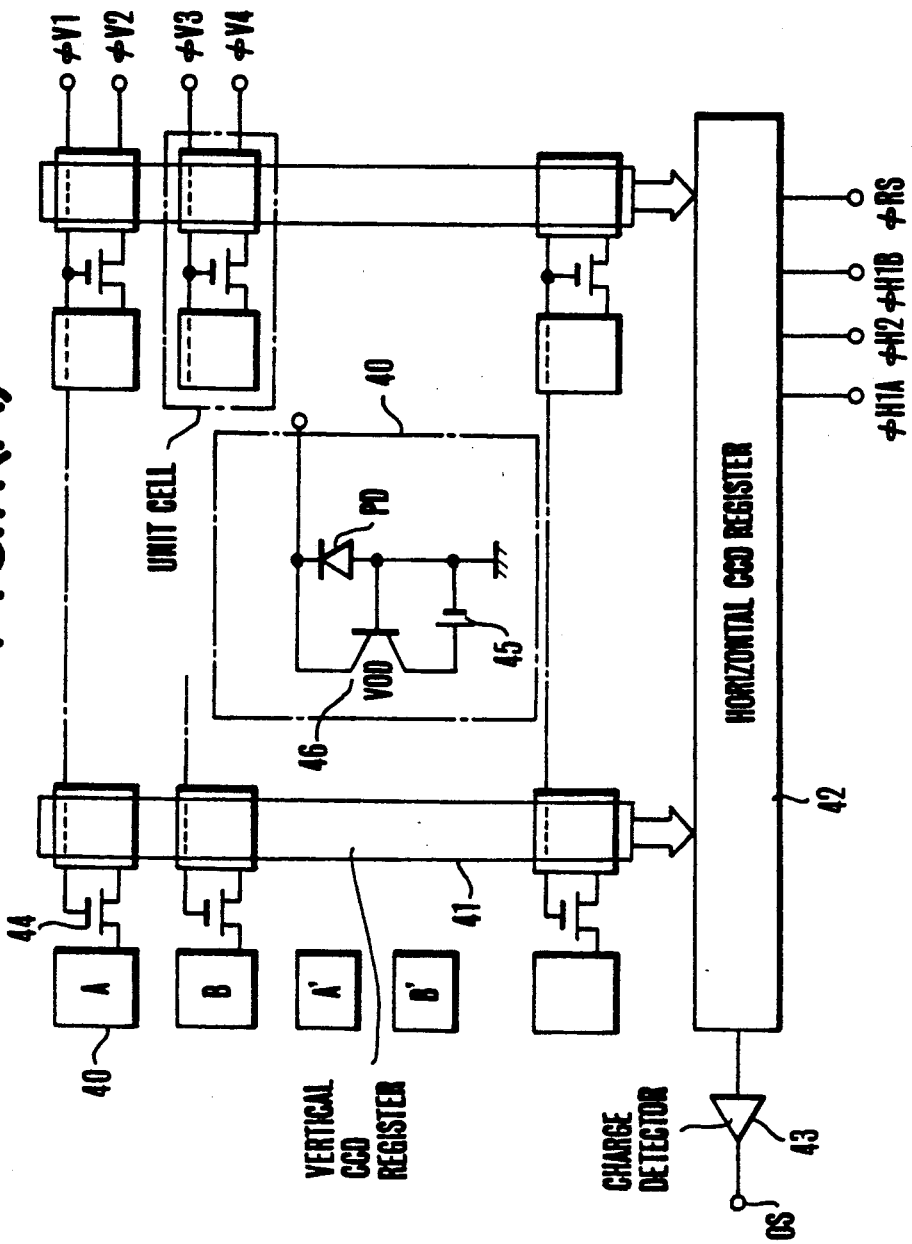

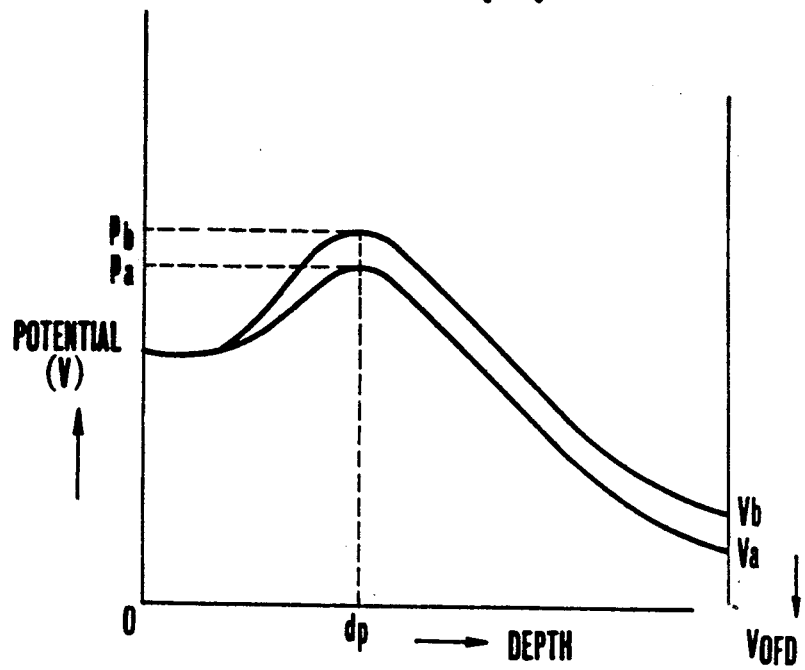
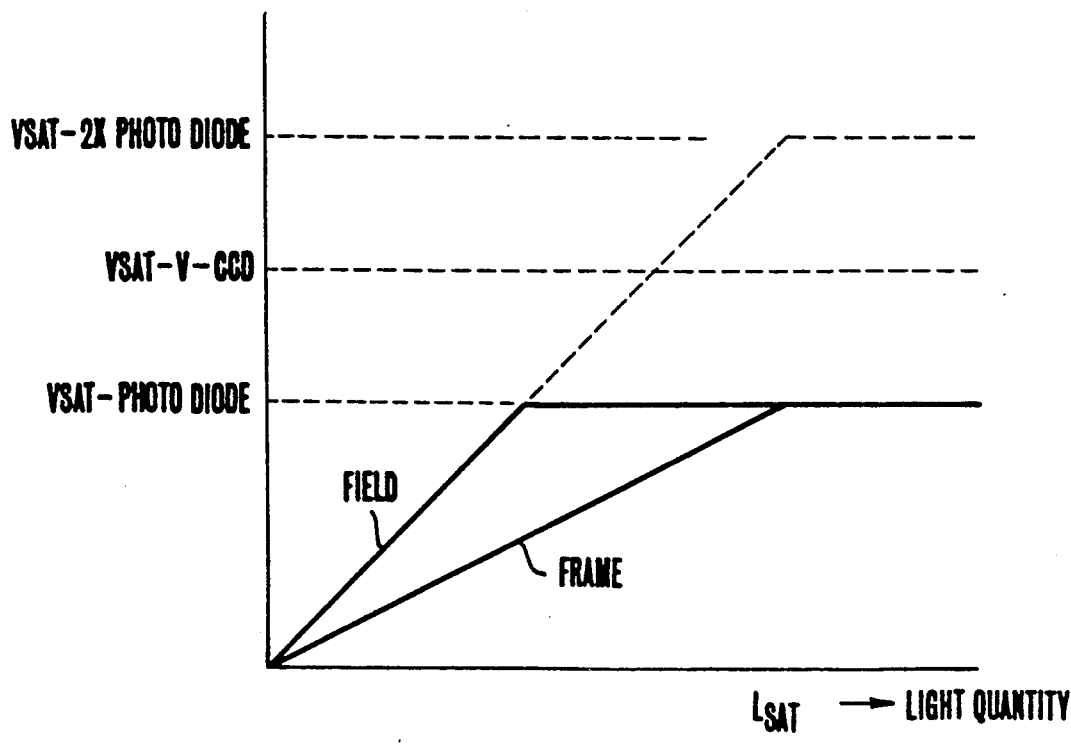

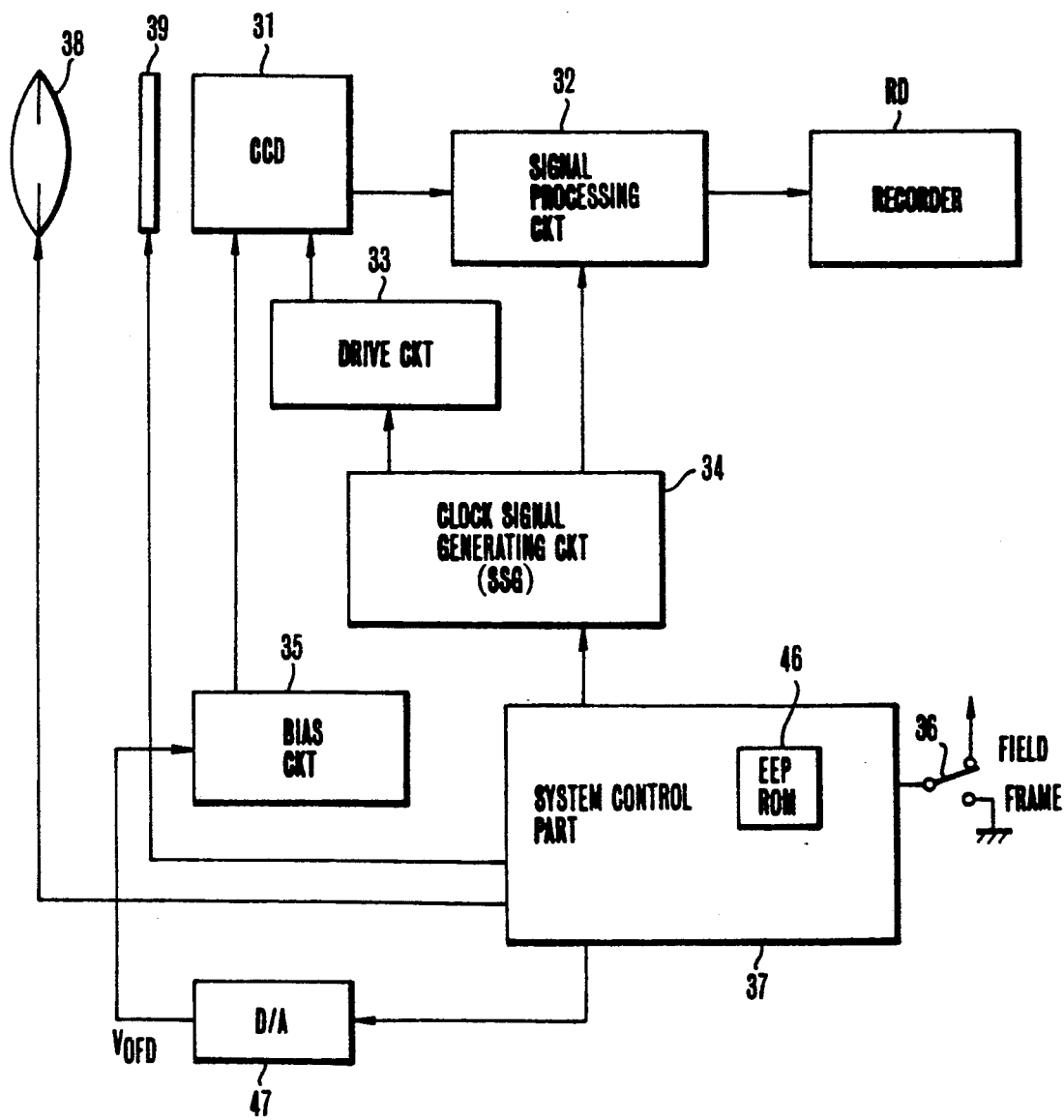

IMAGE SENSING DEVICE WITH NON-LINEAR CONVERTING MEANS

This is a continuation application under 37 CFR 1.62 of prior application Ser. No. 554,746, filed Jul. 18, 1990, abandoned, which is a division of application Ser. No. 453,213, filed Dec. 13, 1989, patented Oct. 16, 1990, U.S. Pat. No. 4,963,980, which is a continuation of application Ser. No. 151,573, filed Feb. 2, 1988, abandoned.

BACKGROUND OF THE INVENTION

1. Field of the Invention

This invention relates to an image sensing device which is arranged to permit selection of either a field reading mode (hereinafter referred to as the field mode) or a frame reading mode (hereinafter referred to as the frame mode).

2. Description of the Related Art

There are electronic still cameras of the kind arranged to permit a selection between a field image signal and a frame image signal in forming an image signal within an image sensor before reading it out for recording. An example of the camera of this kind is disclosed in Japanese Laid-Open Patent Application No. SHO 58-48455.

FIG. 6 of the accompanying drawings shows the switching circuit of an electronic still camera of the above stated kind arranged to permit a selection between the field mode and the frame mode. The illustration includes an adder 60; signals $62_1$ and $62_2$ produced from odd-number field picture elements (hereinafter referred to as ODD picture elements) and even-number field picture elements (hereinafter referred to as EVEN picture elements) respectively; change-over switches S1 and S2 which are provided for a selection between the field mode and the frame mode; field mode selecting contacts A1 and B1; frame mode selecting contacts A2 and B2; a terminal A3 which is provided for reading a field image; and terminals B3 and B4 which are provided for reading the odd- and even-number field portions of the frame image signal, respectively. When the moving contacts of the field mode/frame mode change-over switches S1 and S2 are on the side of the frame mode selecting contacts A2 and B2, the information of the ODD picture elements and that of the EVEN picture elements are serially read out from the reading terminals B3 and B4 for every field. In case that the moving contacts of the change-over switches S1 and S2 are on the side of the field mode selecting contacts A1 and B1, the information of the ODD picture elements and that of the EVEN picture elements are added together by the adder 60 and read out from the reading terminal A3 as a field image.

FIG. 7(A) shows relations obtained between the quantity of incident light and the intensity of an output signals obtained in the field mode and in the frame mode. FIG. 7(B) shows a relation between the illuminance of a object and the intensity of the output signal obtained in the frame mode with the incident light quantity optically reduced to ½ by means of an ND filter or an exposure device. Referring to these drawings, reference symbols Vs1 and Vs2 denote saturation output voltages obtained in the frame mode and in the field mode. A symbol Hs denotes saturation light quantity on the image sensing plane. Symbols Ls1 and Ls2 denote saturation degrees of object's illuminance obtained in the frame mode and in the field mode respectively. As apparent from the characteristic curves of FIG. 7(A), the sensitivity obtained on the image sensing plane is higher by two times in the field mode than in the frame mode.

The electronic still camera is generally arranged to perform a process of suppressing the high luminance portion of an image signal for obtaining an effect called a knee effect (hereinafter referred to as a knee process) with regard to the problem relative to the dynamic ranges of the image sensor and signal processing system or the visual sensation characteristic of human. FIGS. 8(A), 8(B), 9(A) and 9(B) respectively show the result of the knee process applied to the characteristics shown in FIGS. 7(A) and 7(B). In these drawings, a reference symbol Vk denotes a knee point voltage which is the start voltage of the knee process; and a symbol Vmax denotes a maximum signal level determined by the dynamic range of the signal processing system. Further, FIGS. 8(A) and 9(A) show the results of the knee process carried out in such a way as to cause the saturation voltage obtained in the frame mode to become the above stated maximum signal level Vmax. FIGS. 8(B) and 9(B) show the result of the knee process carried out to cause the saturation voltage obtained in the field mode to become the voltage Vmax.

As apparent from these drawings, the output signal intensity obtained in the field mode with the knee process carried out to bring the saturation voltage of the frame mode to the voltage Vmax comes to exceed the dynamic range of the signal processing system. Whereas, in case that the knee process is carried out to bring the saturation voltage obtained in the field mode to the voltage Vmax, the output signal intensity does not reach the voltage Vmax. In the latter case, therefore, there takes place some contrast blunting effect.

Further, in the case of the conventional image sensing device arranged to obtain the sum of the electric charge values of two picture elements within the sensor, the problem of blooming has occurred when the sum comes to exceed the saturation potential of the V-CCD thereof.

SUMMARY OF THE INVENTION

This invention is directed to the solution of these problems of the prior art. It is, therefore, the principal object of this invention to provide an image sensing device which has the optimum dynamic range and is capable of giving adequate pictures both in the field and frame modes.

It is another object of this invention to provide an image sensing device which is capable of preventing occurrence of blooming even if field reading is performed with a transfer CCD which has a small saturation potential and is designed for frame reading.

To attain this object, an image sensing device arranged according to this invention to permit selection between the field mode and the frame mode is provided with knee effect change-over means for changing the knee effect on the output signal of the image sensor from one value over to another in such a way as to give images with the optimum dynamic range both in the field mode and in the frame mode.

Further, to attain the above stated object, an image sensing device arranged as another embodiment of the invention is provided with overflow level change-over means for changing one overflow level over to another level for each of picture elements in response to a selection made between field reading and frame reading. With a transfer CCD which has a small saturation potential employed as the image sensor, the above stated arrangement of the embodiment effectively prevents occurrence of blooming because the saturation potential of the transfer CCD is never exceeded by virtue of the overflow control even in the event of field reading.

Other objects and features of this invention will become apparent from the following detailed description of embodiments thereof taken in connection with the accompanying drawings.

BRIEF DESCRIPTION OF THE DRAWINGS

FIGS. 3(A) and 3(B) show the output signal intensity of the electronic still camera of this invention obtained in relation to the quantity of light incident on the camera and to the illuminance of an object with the knee point changed from one level over to another according to a selection made between the field mode and the frame mode.

FIGS. 4(A) and 4(B) likewise show the output signal intensity in relation to the quantity of light incident on the still camera and to object illuminance with a knee compression rate changed according to a selection made between the field and frame modes.

FIGS. 7(A) and 7(B) respectively show the output signal intensity of the camera in relation to the quantity of incident light and to the illuminance of an object obtained in the field and frame modes.

FIGS. 8(A) and 8(B) show the output signal intensity of the conventional camera obtained in relation to incident light quantity on the basis of sensitivity obtained in the frame and field mode.

FIGS. 9(A) and 9(B) show the output signal intensity of the conventional camera obtained in relation to the illuminance of an object on the basis of sensitivity obtained in the frame and field modes with the incident light quantity changed according to a selection made between the frame mode and the field mode.

FIG. 11(A) shows in outline a CCD employed in the third embodiment.

FIG. 11(B) shows the distribution of potential in the direction of depth of a vertical overflow drain type photo diode which is popularly in use.

FIG. 11(C) shows the sensitivity characteristic of a CCD used for the third embodiment.

FIG. 16 is a block diagram showing a fifth embodiment of the invention which has a memory arranged within the system control part of the third embodiment arranged as shown in FIG. 10.

DETAILED DESCRIPTION OF THE PREFERRED EMBODIMENTS

Figure 1:
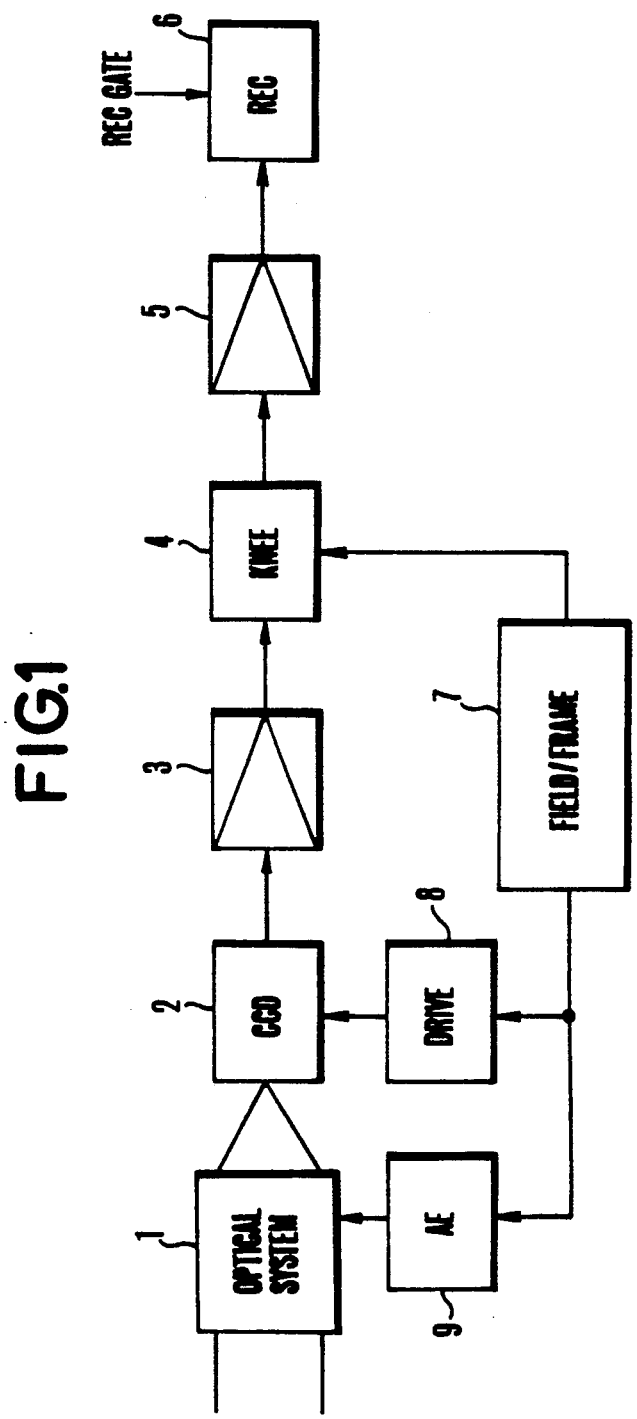
FIGS. 1 and 2 are block diagrams showing electronic still cameras as first and second embodiments of this invention.

Examples of embodiment of this invention are described below with reference to the accompanying drawings:

FIG. 1 shows in a block diagram a first embodiment of this invention. In this case, the invention is applied to an electronic still camera which is selected by way of example as an image sensing device. Referring to FIG. 1, an image sensing optical system 1 consists of a lens, a diaphragm, a shutter, etc. A CCD (charge coupled device) 2 is employed as an image sensor. A preamplifier 3 is arranged to amplify the output of the CCD 2. A reference numeral 4 denotes a knee process circuit. An output amplifier 5 is arranged to amplify the output of the knee process circuit 4. An image recorder 6 is a magnetic disc type recorder or the like. A numeral 7 denotes a field mode/frame mode selection circuit. A drive circuit 8 is arranged to drive the CCD 2. An AE circuit 9 is provided for exposure control.

The electronic still camera which is arranged in this manner as the first embodiment of this invention operates in the following manner: The image sensing optical system 1 obtains an image of an object to be photographed. The image is formed on the CCD 2 and is then undergoes a knee process performed through the preamplifier 3 by the knee process circuit 4. The knee process circuit 4 thus produces an image signal, which is recorded via the output amplifier 5 by the image recorder 6.

The position of each of the AE circuit 9 and the drive circuit 8 is switched from one position over to another according to the switching position of the field mode/frame mode selection circuit 7. In the field mode, the AE circuit 9 determines an exposure condition suited for sensitivity obtained in the field mode. An object's image obtained under this exposure condition is photoelectric converted by the CCD 2. An electric charge thus obtained is read out and produced in accordance with a method determined by the drive circuit 8. More specifically, an ODD picture element portion and an EVEN picture element portion of a signal are added together within a vertical register, a horizontal register or a CCD output amplifier or the like and are produced as an output of the CCD 2. Further, at the knee process circuit 4, a knee process characteristic for the field mode is selected in accordance with a signal from the selection circuit 7 and a knee process is appositely carried out.

In the frame mode, the position of the selection circuit 7 is shifted to a frame mode selecting position. Then, the AE circuit 9 determines an exposure condition suited for the sensitivity obtainable in the frame mode. The CCD 2 performs the photo-electric converting action on an object's image obtained under the exposure condition, which allows an exposure to be made about twice as much as an exposure to be allowed in the field mode. Electric charge values of the ODD and EVEN picture elements which are cumulatively stored at the CCD 2 are serially read out in accordance with the signal output of the drive circuit 8. The output of the CCD 2 is supplied via the preamplifier 3 to the knee process circuit 4. The circuit 4 selects a knee process characteristic for the frame mode in accordance with a signal produced from the selection circuit 7 and appositely performs a knee process. A signal thus processed is recorded by the recorder 6.

The electronic still camera of this embodiment is arranged to change the incident light quantity from one quantity over to another according to the selection of the field mode or the frame mode. Therefore, the output characteristic of the amplifier 3 becomes as shown in FIG. 7(B). In the case of another embodiment of this invention in which the AE circuit 9 is not change-over controlled according to the selection of the field mode or the frame mode, the output characteristic of the amplifier 3 becomes as shown in FIG. 7(A). FIGS. 3(A) and 3(B) show examples of knee effect change-over, which correspond to what is shown in FIGS. 7(A) and 7(B). Referring to FIGS. 3(A) and 3(B), a reference symbol Vk1 denotes a knee point voltage obtained in the frame mode and a symbol Vk2 a knee point voltage in the field mode.

Both the examples are capable of having the saturation level of the picture element output coincide with the upper limit Vmax of the dynamic range of the signal processing system even in a high luminance region in both the field mode and the frame mode by virtue of the arrangement to shift the knee point voltage to the voltage Vk2 or Vk1 according to the selection of the field or frame mode as shown in these drawings. An image signal, therefore, can be obtained in an adequate state. Further, these examples have the same knee compression rate (the inclination of the characteristics shown).

Figure 5A:
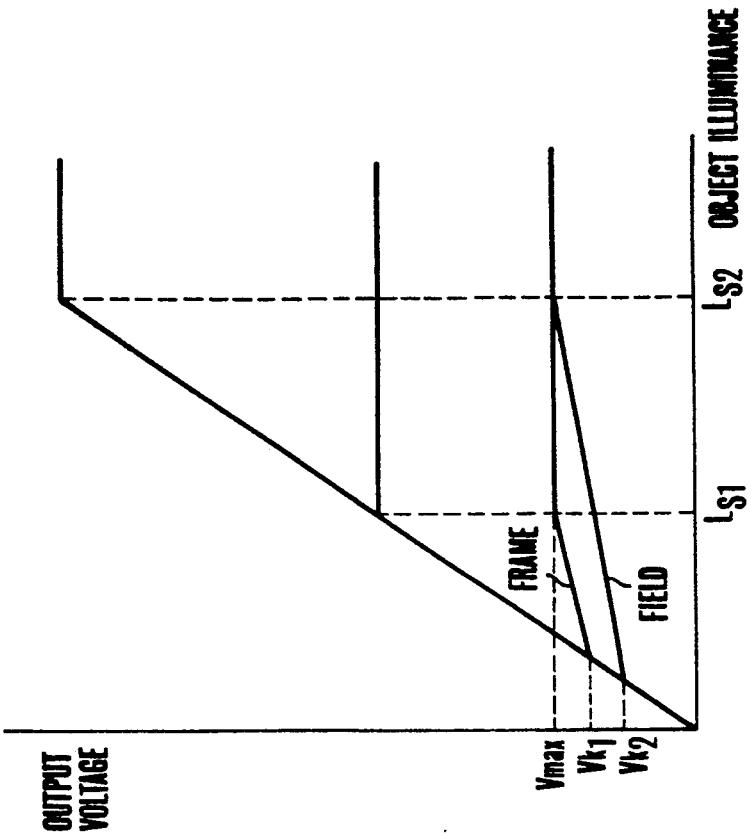
FIGS. 5(A) and 5(B) likewise show the output signal intensity in relation to incident light quantity and to object illuminance obtained with change-over of the level of knee point and the knee compression rate.
Figure 5B:
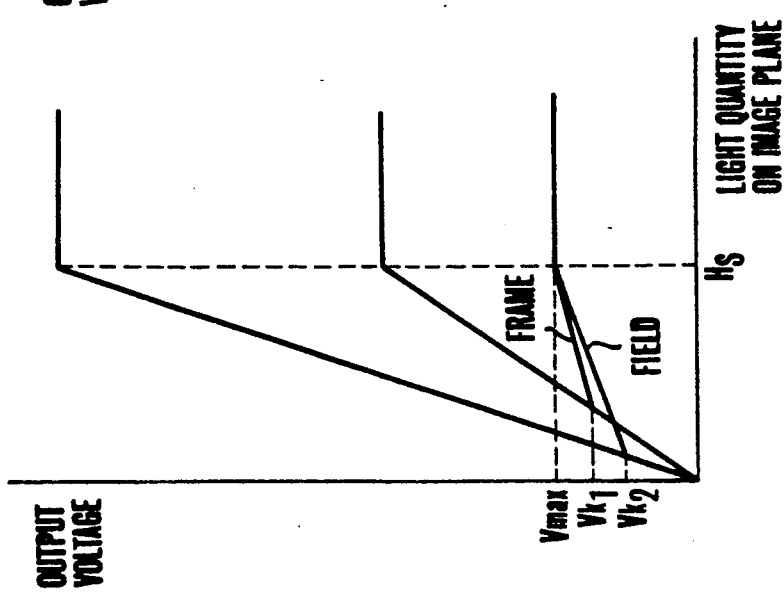
Figure 6:
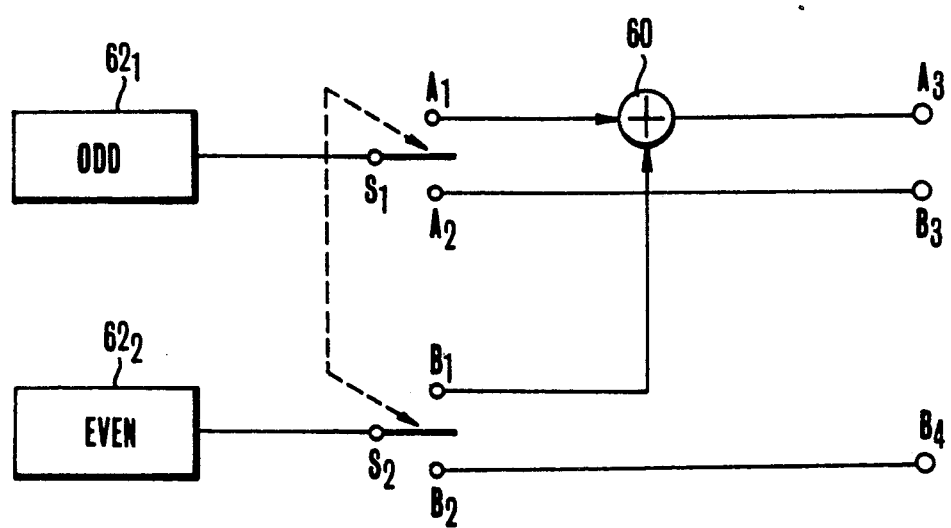
FIG. 6 is a diagram showing a switching circuit of the conventional electronic still camera which is arranged to permit a selection between the field mode and the frame mode.

FIGS. 4(A), 4(B), 5(A) and 5(B) show other examples of embodiment arranged to make knee effect change-over in different manners. In the cases of FIGS. 4(A) and 4(B), the knee point voltage is arranged to be the same both in the field and frame modes while the knee compression rate is arranged to vary according to the selection of the field mode or the frame mode. This arrangement also gives an adequate image. In the case of FIGS. 5(A) and 5(B), both the knee point voltage and the knee compression rate are arranged to be variable. This arrangement gives a better image.

In the case of the first embodiment shown in FIG. 1, the knee process circuit 4 is thus arranged to have the knee effect change-over controlled in a manner as shown in FIG. 3(B), 4(B) or 5(B). In case that the AE characteristic is not changed according to a selection of the field mode or the frame mode, the knee effect change-over is controlled in the manner as shown in FIG. 3(A), 4(A) or 5(A).

Figure 2:
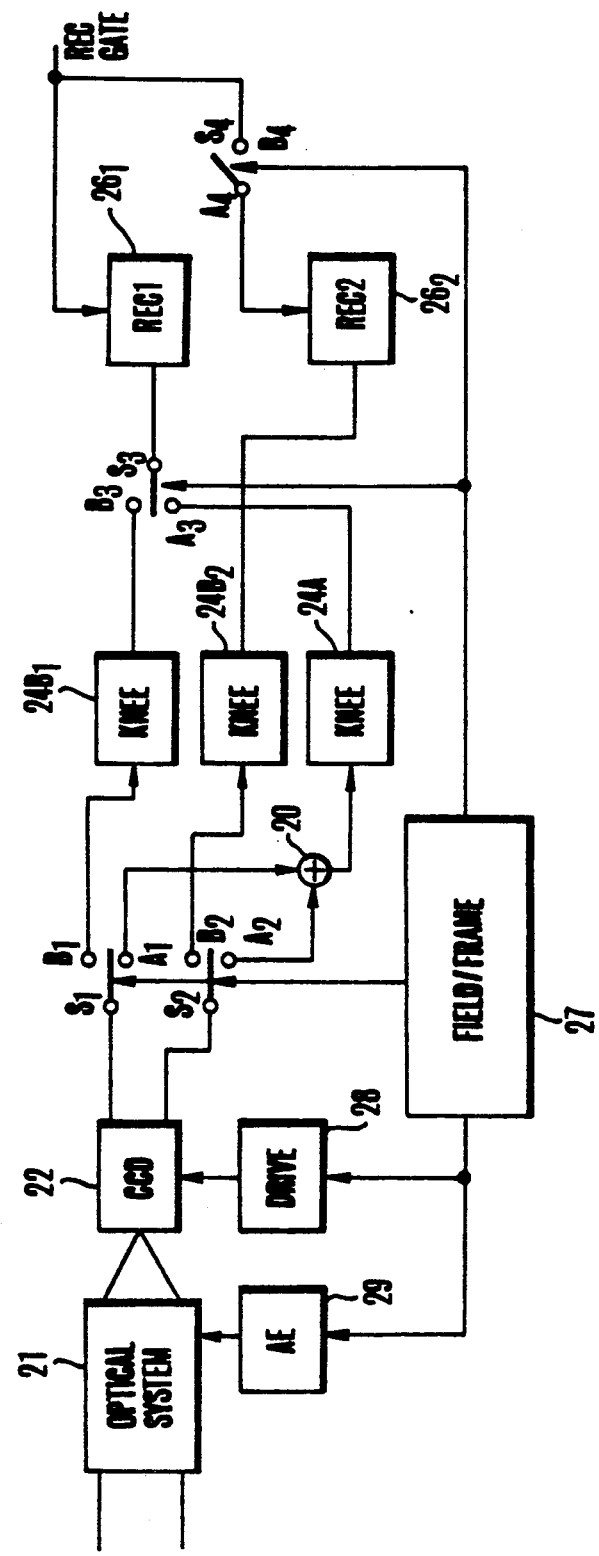

FIG. 2 is a block diagram showing an electronic still camera which is arranged according to this invention as a second embodiment thereof. The illustration includes an adder 20; an image sensing optical system 21; a CCD 22; a knee process circuit 24A for the field mode; knee process circuits 24B1 and 24B2 for an ODD picture element signal and for an EVEN picture element signal obtained in the frame mode; image recorders 26₁ and 26₂; a field mode/frame mode selection circuit 27; a CCD drive circuit 28; an AE circuit 29; field mode/frame mode selection switches S1 to S4; field mode selection contacts A1 to A3; and frame mode selection contacts B1 to B4.

In the field mode of the second embodiment, the image information values of two fields are added together not within the CCD 22 but by means of an adder 20 which is disposed outside of the CCD 22. Further, in the field mode, the moving contacts of the selection switches S1, S2 and S3 are shifted by the selection circuit 27 to the field mode selection contacts A1, A2 and A3 while the selection switch S4 is shifted to an open state. In the frame mode, the selection circuit 27 shifts the positions of the selection switches S1 to S3 to the frame mode selection contacts B1 to B3 and closes the selection switch S4. In this manner, a plurality of knee process circuits are used instead of the use of a single knee process circuit. The knee process is carried out by selectively using these plurality of circuits. With the exception of this, the rest of the arrangement of the second embodiment is similar to the first embodiment.

As apparent from the foregoing description, the first and second embodiments of this invention are capable of giving an adequate image with the optimum dynamic range by changing the knee processing operation on the output signal of the image sensing device according to the selection of the field mode or the frame mode.

Figure 10:
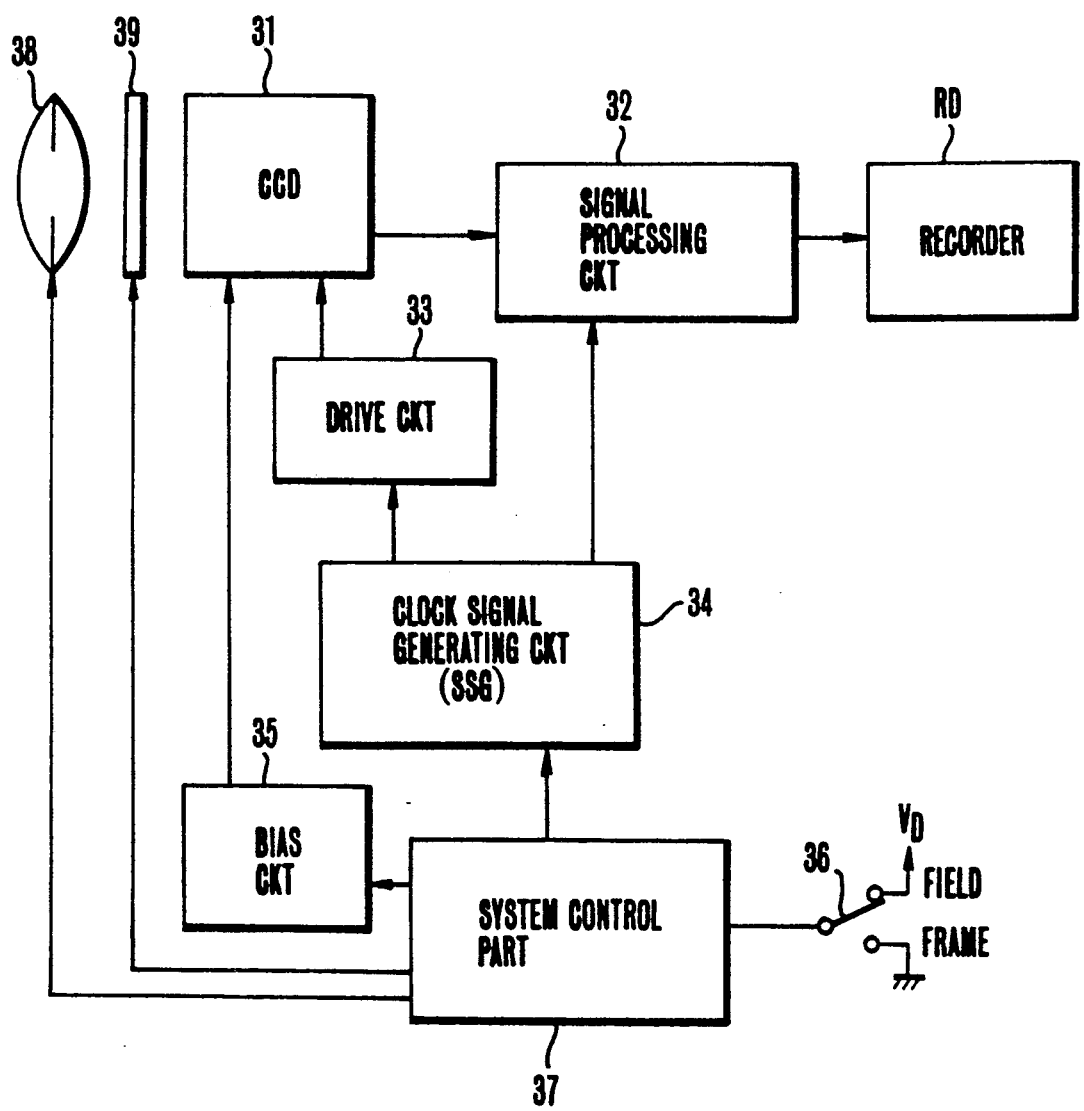
FIG. 10 is a block diagram showing in outline the arrangement of the essential parts of a third embodiment of this invention.

FIG. 10 shows in a block diagram an image sensing device which is arranged as a third embodiment of this invention to permit a selection between the field reading mode and the frame reading mode. The illustration includes a CCD 31; a signal processing circuit 32; a recorder RD; a drive circuit 33 which is arranged to drive the CCD 31; a clock signal generating circuit 34 which is arranged to generate pulses for driving the CCD 31 and pulses to be used by the signal processing circuit 32; a bias circuit 35 which is arranged to generate a bias voltage necessary for the CCD 31; a selection switch 36 which is arranged to change the field reading mode over to the frame reading mode and vice versa; a system control part 37 which is arranged to control the whole system; a lens 38 with a diaphragm; and a shutter 39. The system control part 37 causes the bias circuit 35 to change an overflow drain voltage which will be described later between a value Va and another value Vb according to a selection made between the field mode and the frame mode.

FIG. 11(A) shows in outline the arrangement of the CCD employed in the third embodiment shown in FIG. 10. FIG. 11(B) shows the distribution of potential of the CCD in the direction of depth of a photo diode part. The CCD is an inter-line type CCD, wherein the photo diode part which serves as picture elements having a vertical overflow drain arrangement. These illustrations include photo diodes 40; a vertical CCD register 41 (hereinafter referred to as V-CCD); a horizontal CCD register 42 (hereinafter referred to as H-CCD); an electric charge detector 43; transistor switches 44; terminals $\phi v1$, $\phi v2$, $\phi v3$ and $\phi v4$; and the above stated overflow drain voltage VOFD 45.

With an object's image of a high degree of luminance formed on the image plane, when the potential of the photo diode in the picture element area having the high luminance extremely rises, an excess electric charge generated at the photo diode 40, in this case, overflows a potential barrier determined by the overflow drain voltage VOFD 45 and is thus produced toward a substrate. Blooming is prevented by this arrangement.

Further, as shown in FIG. 11(B), there is a crest of potential at a depth point dp. Assuming that the overflow drain voltage VOFD is set at a voltage Va, the potential crest is at a voltage Pa. With the overflow drain voltage VOFD assumed to be set at a voltage Vb, the potential crest becomes a voltage Pb. Therefore, the saturation potential of the photo diode decreases accordingly as the crest of potential is lowered by changing the overflow drain voltage VOFD. Conversely, the saturation potential of the photo diode becomes higher accordingly as the crest of potential is made to become higher. Further the voltages Va and Vb are in the relation of Va>Vb.

In the case of the third embodiment, the saturation potential of the photo diode is controlled by controlling the overflow drain voltage VOFD. In other words, the dynamic range is increased by setting the overflow drain voltage VOFD at a relatively low level in the frame mode. In the field mode, the blooming preventing effect is increased by setting the overflow drain voltage VOFD at a relatively high level.

FIG. 11(C) shows in a graph the sensitivity characteristic of the CCD of the third embodiment shown in FIG. 10. The axis of abscissa of the graph indicates the quantity of light and the axis of ordinate the level of signal potential. The bias circuit 35 is controlled to set the overflow drain voltage VOFD at a higher level in the field mode than in the frame mode as shown in FIG. 11(C). In other words, possible blooming in the field mode can be prevented without impairing the dynamic range for the frame mode by arranging the sum of the electric charges of the photo diodes of rows A and B not to exceed the saturation potential of the V-CCD.

Figure 12:
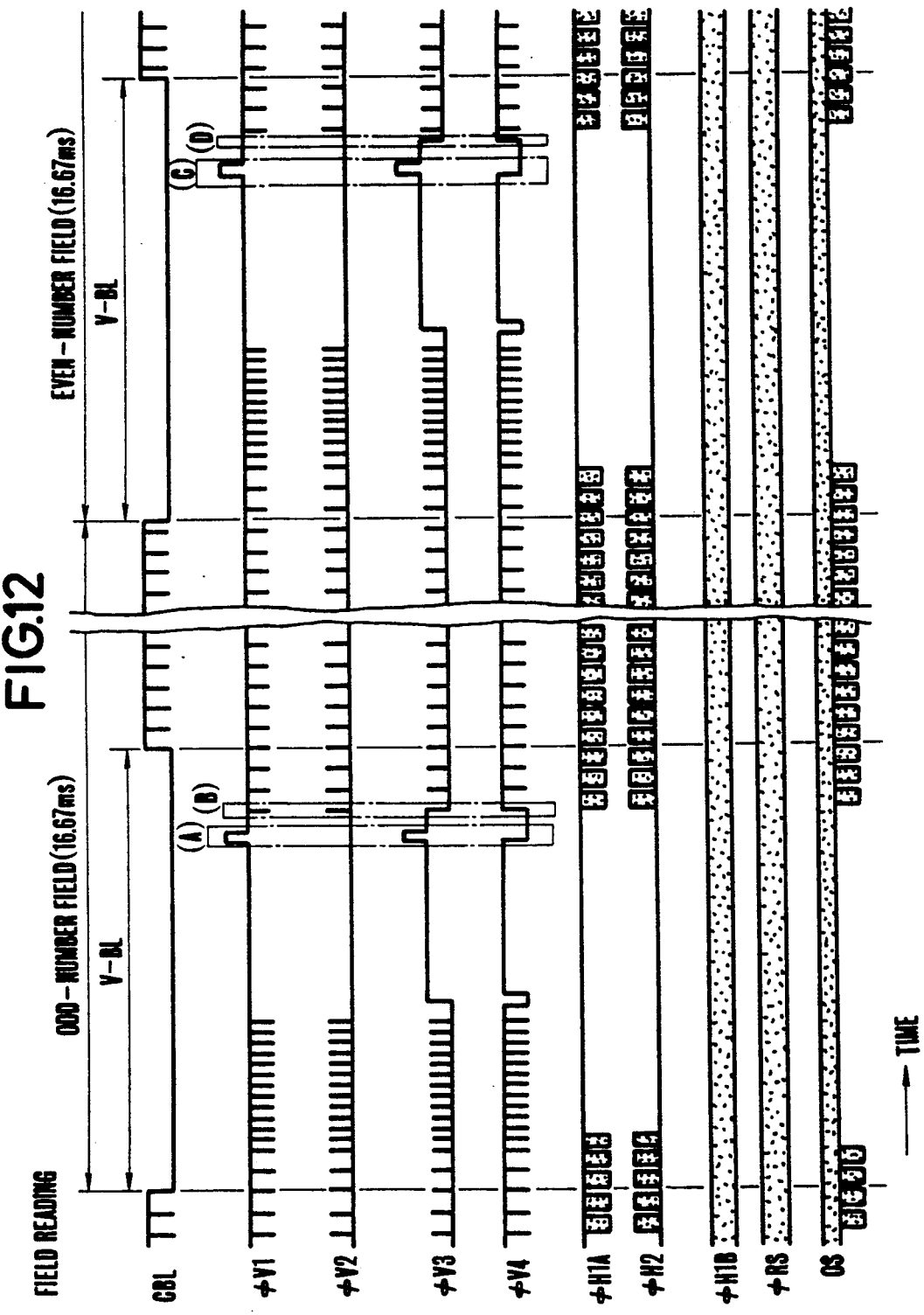
FIG. 12 is a driving timing chart showing a filed reading operation.
Figure 13:
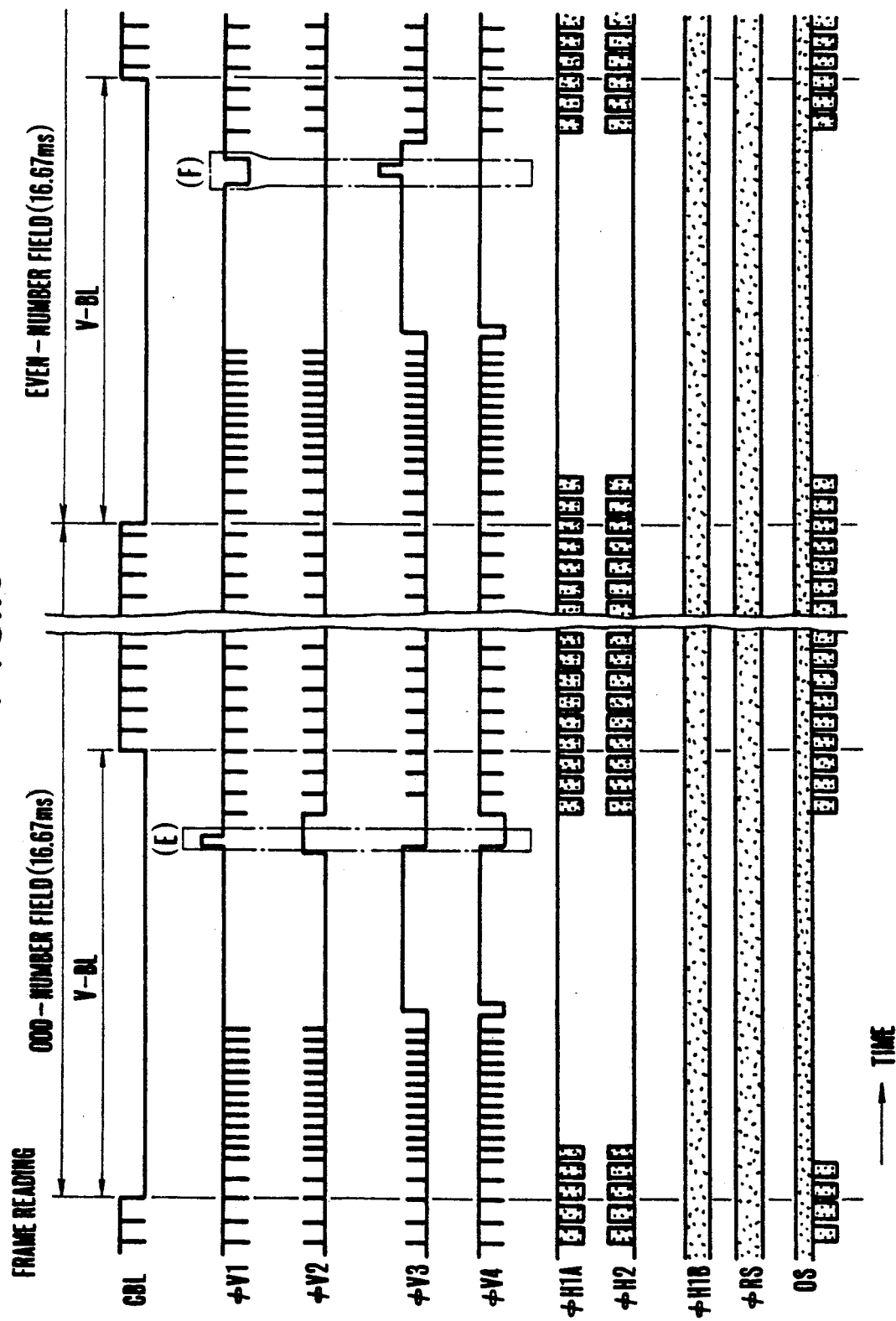
FIG. 13 is a driving timing chart showing a frame reading operation.

FIG. 12 shows in a timing chart a driving action performed in the field mode on the CCD arrangement shown in FIG. 11(A). FIG. 13 is another timing chart showing a driving action on the CCD arrangement as performed in the frame mode.

Referring to the block diagram of FIG. 10, the electric charge is read out from the CCD 31 according to the timing of FIG. 12 when the position of the switch 36 is shifted to a field mode selecting side. Referring to FIG. 11(A), the terminals $\phi v1$ and $\phi v3$ are arranged to serve combined functions as transfer electrodes for transferring the electric charge from within the V-CCD 41 and also as electric charge shift gates for shifting the electric charge from the photo diodes PD disposed for picture elements to the V-CCD 41. As shown in FIGS. 12 and 13, the terminals $\phi v1$ and $\phi v3$ are arranged to have three levels. The output of the V-CCD 41 is transferred when clocking is made at a point between a low (L) level and a medium (M) level of these terminals. When the value of the terminals becomes a high (H) level, the electric charge is shifted from the photo diode 40 to the V-CCD 41 to be transferred to the H-CCD 42 at the timing of ensuing horizontal blanking for forming an image signal. The reading operations in the field and frame modes of the embodiment are as described below:

Referring to FIG. 12, in reading for an odd-number field, a pulse obtained at a part (A) causes the levels of the terminals $\phi v1$ and $\phi v3$ to become high levels at the same time. This causes the electric charges of the rows A and B of the photo diode 40 to be simultaneously shifted to the V-CCD 41. The electric charges of the rows A and B are caused to be added together by a pulse obtained at a part (B) and the electric charge thus obtained is transferred into the V-CCD 41. Then, the electric charges of other rows A' and B' are likewise added together and transferred. Next, in reading for an even-number field, the electric charges of the rows A and B are caused to be simultaneously read out by a pulse obtained at a part (C). The reading point of time is the same as in the case of reading for the odd-number field. However, since the electrode (or terminal) $\phi v1$ is at a medium level at a part (D) in this instance, the charge of the row A is not transferred in response to the pulse of the part (D). Meanwhile the electric charge of the row B and that of the row A', i.e. an interlaced row of the odd-number field, are added together. In accordance with this method of reading, the signal of each photo diode 40 is normally read out in one field period. Therefore, this method is called field reading. A reference symbol CBL denotes a blanking pulse.

Next, the frame reading operation which is as shown in FIG. 13 is as follows: In reading for an odd-number field, a pulse obtained at a part (E) causes the level of the terminal $\phi v1$ to become high (or H) to allow the electric charges of the rows A and A' to be read out. In reading for an even-number field, a pulse obtained at a part (F) causes the level of the terminal $\phi v3$ to become high to allow the electric charges of rows B and B' to be read out. In this method of reading, the signal of each photo diode 40 is normally read out in one frame period, i.e. in two field periods, and is thus called frame reading.

Figure 14:
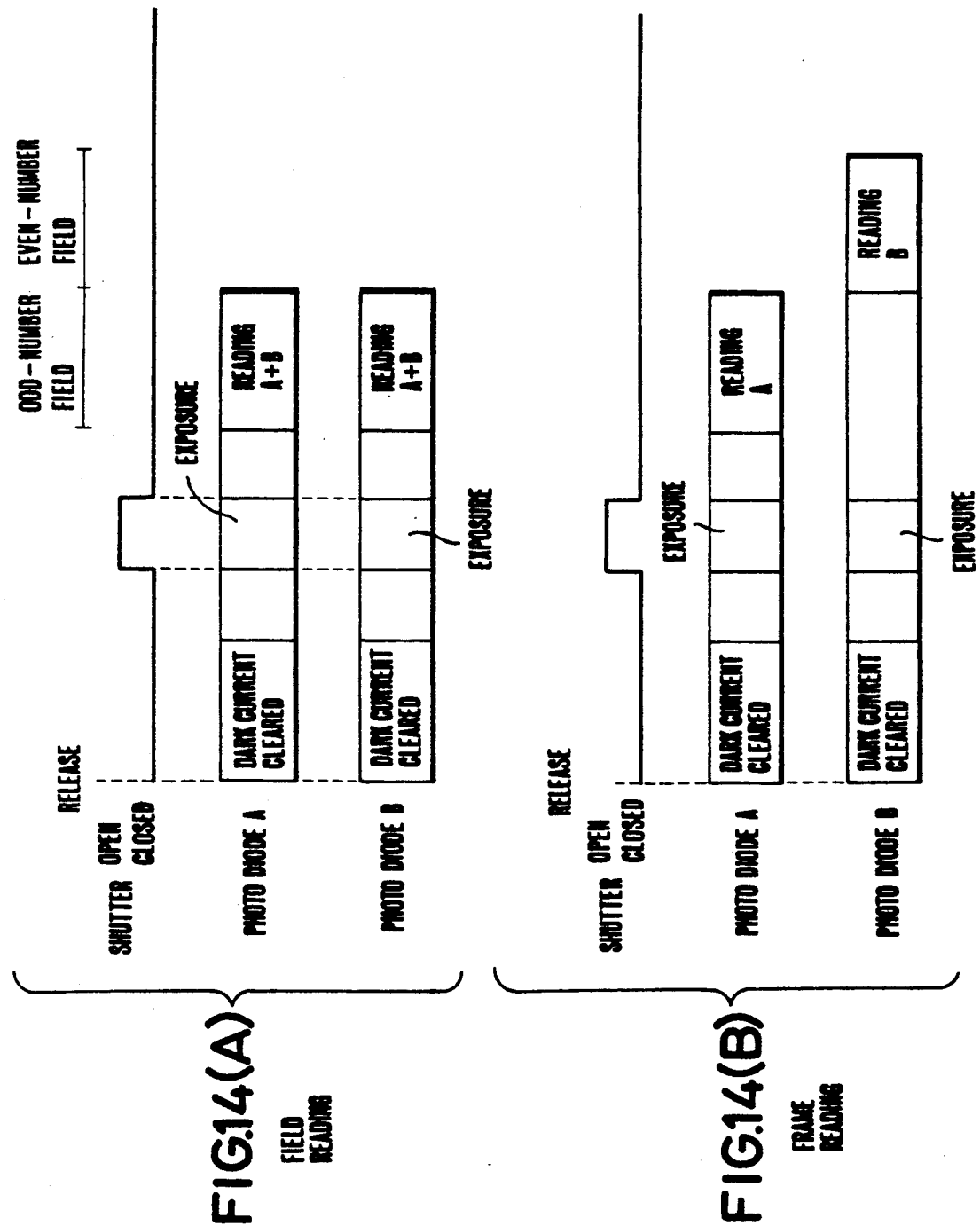
FIGS. 14(A) and 14(B) show in outline the image sensing sequence of processes of an electronic still camera which is arranged as a fourth embodiment of this invention.

FIGS. 14(A) and 14(B) schematically show the image sensing sequence of processes of an electronic still camera which is arranged as a fourth embodiment of this invention. The field reading and the frame reading of this camera are as follows: Referring to FIG. 14(A) which shows the field reading, a dark current within the CCD 31 is cleared within a given period of time in response to a shutter release signal. Then, an exposure is effected when the shutter 39 is opened. Then, the exposure is terminated by closing the shutter 39. After this, the electric charge of the photo diodes 40 of the row A and that of the photo diodes 40 of the row B are simultaneously read out. The electric charge of the row A and that of the row B are added together before they are read out as a signal of an odd-number field. The details of the timing for reading are the same as the timing for the odd-number field shown in FIG. 12.

In the case of frame reading which is as shown in FIG. 14(B), the processes of the operation of the camera up to an exposure is the same as in the case of field reading as shown in FIG. 14(A). In reading the electric charge, however, the charge of the photo diodes 40 of the row A is read out for an odd-number field while that of the row B is read out for an even-number field. The details of timing for reading are the same as those shown in FIG. 13.

Figure 15:
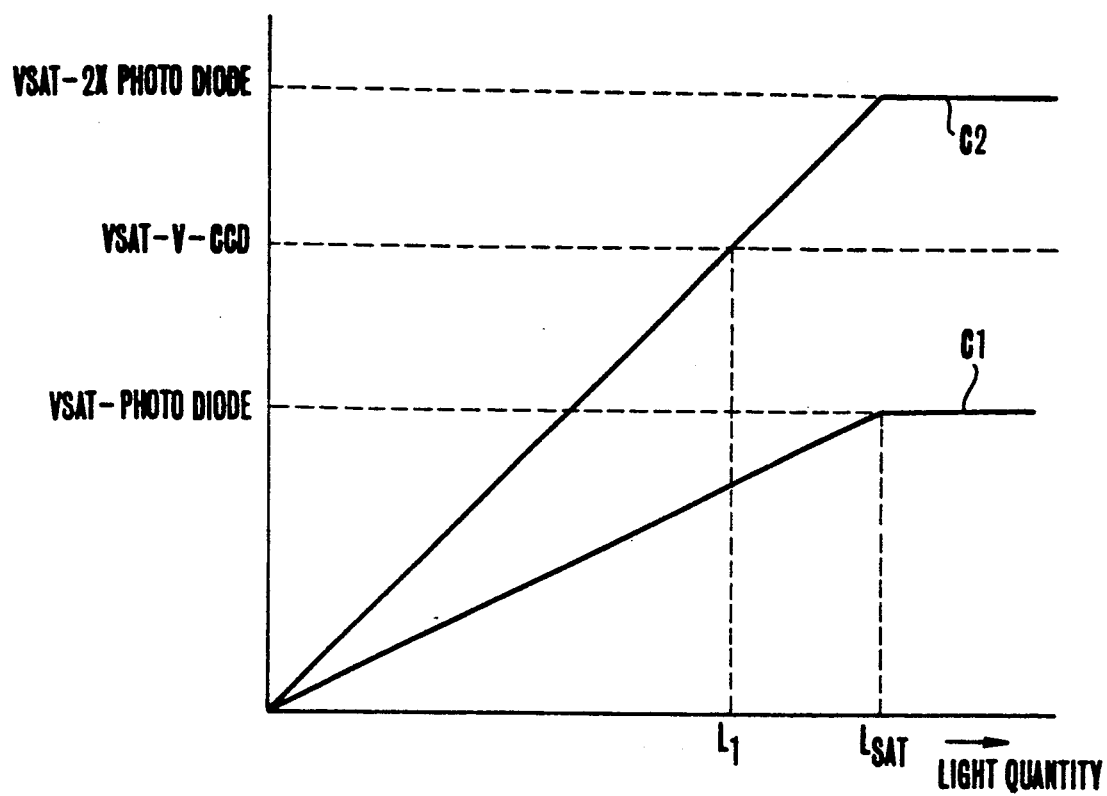
FIG. 15 shows the sensitivity characteristic of an ordinary CCD.

FIG. 15 shows the sensitivity characteristic of the CCD 31. The axis of abscissa of FIG. 15 indicates light quantity and the axis of ordinate the potential level of the signal. A reference symbol VSAT denotes a saturation potential. A symbol VSAT-V-CCD denotes the saturation potential of the V-CCD. Symbols L1 and LSAT respectively denote a light quantity at which the V-CCD and photo diodes reach their saturation potentials. A symbol C1 denotes an output curve of the photo diodes. A symbol C2 denotes a curve representing the result of addition of two picture-element portions of the signal.

With the degree of exposure assumed to be the same, the field reading mode gives a sensitivity or signal level which is twice as high as the level obtained in the frame reading mode as shown in FIG. 15. However, since the number of picture elements of the signal obtained by frame reading is twice as much as the number of picture elements obtainable by field reading, the resolution of frame reading is twice as high as the field reading. Generally, in the case of a CCD which is designed for frame reading, the V-CCD is arranged to be as narrow as possible for the purpose of increasing the sensitivity and the opening rate of the photo diodes is arranged to be as large as possible for an increased light receiving area. In that instance, it is generally impossible to arrange the V-CCD to have a large saturation potential capacity. Generally, therefore, the saturation potential of the V-CCD is about 1.5 times as high as that of the photo diode as shown in FIG. 15. Therefore, if the device of FIG. 11(A) is used for field reading as it is, the sum of electric charges of the photo diodes of rows A and B would exceed the saturation potential of the V-CCD to cause blooming as two picture elements adjacently arranged in the vertical direction are receiving the light quantity L1.

Whereas, in accordance with this invention, this problem is solves by changing the overflow bias level according to the selection of the field reading mode or the frame reading mode.

FIG. 16 shows in a block diagram a fifth embodiment of this invention. In this case, a memory arrangement is provided within the system control part 37 of the embodiment shown in FIG. 10. The system control part 37 in this case includes an EEPROM 46. The potentials Va and Vb of the overflow drain voltage VOFD is stored by this EEPROM 46. This information is arranged to be supplied via a digital-to-analog (D/A) converter 47 to the bias circuit 35. The fifth embodiment which is arranged as shown in FIG. 16 operates as follows: The optimum values Va and Vb of the overflow drain voltage VOFD for the field reading and frame reading modes are written beforehand into the EEPROM 46. When the field reading mode or the frame reading mode is selected by the switch 36, the value of the overflow drain voltage VOFD which is apposite to the reading mode selected is read out from the EEPROM 46. The value information thus read out is converted into a voltage by the D/A converter 47 and is applied via the bias circuit 35 to the CCD 31.

This arrangement not only enables the embodiment to supply the CCD 31 always with the optimum overflow drain voltage VOFD irrespectively of the selection of the field or frame reading mode but also permits adjustment with digital data instead of volume adjustment. Therefore, the number of volumes can be reduced. The arrangement is therefore quite advantageous in making an arrangement for automatic adjustment.

While the embodiment described is arranged to control the overflow level by changing the drain voltage of the vertical overflow drain, this arrangement may be changed, for example, as follows: In cases where overflow is controlled by means of electric charge recoupling pulses as disclosed, for example, in Japanese Laid-Open Patent Application No. SHO 59-153385, the overflow level is lowered by increasing the frequency of the pulses and is raised by decreasing the frequency.

As described in the foregoing, the embodiment of this invention is provided with means for changing overflow level of each picture element from one level over to another. The image sensor, therefore, can be driven under the optimum condition without impairing the dynamic range of the sensor in the case of frame reading and without impairing a blooming resisting characteristic in the case of field reading.

The arrangement to have information on the overflow level written into the EEPROM and to supply from the EEPROM to the image sensor the optimum overflow level information in accordance with a selection made between the field reading mode and the frame reading mode obviates the necessity of volume adjustment. The embodiment is, therefore, highly advantageous in respect to automatic adjustment.

What is claimed is:

1. An image sensing device comprising:
   a) image sensing means having photo-electric converting cells arranged in a plurality of rows and columns to generate electrical signals in accordance with light incident thereon;
   b) reading means for reading said electrical signals of each of said rows one by one in a first mode and said electrical signals of a plurality of rows by adding them together in a second mode, said reading means being arranged to permit a selection between said first and second modes;
   c) signal processing means for effecting a predetermined signal processing of the electrical signals read from said image sensing means, said signal processing means having a predetermined dynamic range; and
   d) non-linear converting means for non-linearly converting levels of said electric signals inputted into said signal processing means, said non-linear converting means being arranged to change its non-linear converting characteristic in said first mode and said second mode, whereby the maximum level of said electric signals in each mode is caused to be substantially equal to the maximum value of the dynamic range of said signal processing means.

2. An image sensing device comprising:
   change-over means for effecting change-over between a field reading mode and a frame reading mode in reading signals formed at picture elements of an image sensor; and
   overflow control means for controlling and changing an overflow level of said picture elements from one level over to another.

3. A device according to claim 2, wherein data which is relative to the overflow level of each of said picture elements and is determined for each of said field reading and frame reading modes is stored at an EEPROM.

4. An image sensing device comprising:
   a) image sensing means having photo-electric converting cells arranged in a plurality of rows and columns to generate electrical signals in accordance with light incident thereon;
   b) reading means for reading a signal of each of signals of each of said rows one by one in a first mode and electrical signals of a plurality of rows by adding them together in a second mode, said reading means being arranged to permit a selection between said first and second modes; and
   c) control means having non-linear converting means for non-linearly converting said electrical signals and for controlling the saturation level of said electrical signals in accordance with a selection between said first and second modes, said converting means being arranged to non-linearly convert levels of said electrical signals in said first mode and said second mode.

5. A device according to claim 4, wherein said reading means is arranged to read signals on a plurality of interlaced liens in the first mode.

6. A device according to claim 4, wherein said control means is arranged to change the exposure condition such that an exposure amount to the image sensing means is smaller in the case of the second mode than in the case of the first mode.

7. A device according to claim 1, further including:
   d) saturation control means for controlling the saturation level of said electrical signals in accordance with the selection between said first mode and said second mode.

8. A device according to claim 7, wherein said saturation control means is arranged to control the saturation levels of said first and second modes to be equal to each other.

9. A device according to claim 4, wherein said control means includes:
   e) a knee processing means for changing a knee effect on a signal output of said image sensing means such that the same dynamic range is used in both said first and second modes.

10. A device according to claim 9, wherein said knee process means is arranged to change said knee effect on said signal output of said image sensing means by changing one knee point level over to another according to the selection of said second mode or said first mode.

11. A device according to claim 9, wherein said knee process means is arranged to change said knee effect on said signal output of said image sensing means by changing one knee compression rate over to another according to the selection of said field reading mode or said frame reading mode.

12. A device according to claim 9, wherein said knee process means is arranged to change said knee effect on said signal output of said image sensing means by changing one knee point level over to another and also by changing one knee compression rate over to another according to the selection of said field reading mode or said frame reading mode.

13. An image sensing device, comprising:
   a) image sensing means including a plurality of photoelectric converting elements for photoelectrically converting a light coming from an object to be photographed;
   b) reading means for reading said image sensing means, said reading means having a first reading mode in which read control is effected to output a signal having a first predetermined level when said image sensing means senses the object under a predetermined illuminance and a second reading mode in which the read control is effected to output a signal having a second predetermined level higher than said first predetermined level when said image sensing means senses the object; and
   c) converting means for non-linearly converting an output signal in the first mode and an output signal in the second mode in different converting characteristic, respectively, said converting characteristics being automatically changed.

14. A device according to claim 13, wherein said non-linear converting means includes a non-linear circuit.

15. A device according to claim 14, wherein said non-linear converting means includes a knee circuit.

* * * * *

UNITED STATES PATENT AND TRADEMARK OFFICE
CERTIFICATE OF CORRECTION

PATENT NO. : 5,157,498

DATED : October 20, 1992

INVENTOR(S) : Akira Suga and Kan Takaiwa

It is certified that error appears in the above-identified patent and that said Letters Patent is hereby corrected as shown below:

Col. 1, line 58, Change "signals" to -- signal --

Col. 1, line 60, Change "a" to -- an --

Col. 2, line 12, Change "human" to -- humans --

Col. 2, line 68, After "of" insert -- the --

Col. 3, line 61, Change "filed" to -- field --

Col. 4, line 10, Change "embodiment" to -- embodiments --

Col. 4, line 32, Delete "is"

Col. 3, lines 44 and 45. Change "photo-electric" to -- photo-electrically --

Col. 5, line 35, Change "embodiment" to -- embodiments --

Col. 6, line 12, Change "these" to -- this --

Col. 6, line 13, Change "cf" to -- of --

Col. 6, line 57, Change "extremely rises" to -- rises extremely --

Col. 9, line 15, Change "solves" to -- solved --

Col. 9, line 58, Change "level" to -- levels --

Col. 10, line 63, Change "liens" to -- lines --

Col. 11, line 1, Change "claim 1" to -- claim 4 --

Col. 11, line 25, Change "field reading" to -- second --

Col. 11, line 26, Change "frame reading" to -- first --

Col. 12, line 2, Change "field reading" to -- second --

Col. 12, line 3, Change "frame reading" to -- first --

UNITED STATES PATENT AND TRADEMARK OFFICE
CERTIFICATE OF CORRECTION

PATENT NO. : 5,157,498
DATED : October 20, 1992
INVENTOR(S) : Akira Suga, et. al.

It is certified that error appears in the above-indentified patent and that said Letters Patent is hereby corrected as shown below:

Col. 12, line 23, Change "characteristic" to --characteristics --.

Signed and Sealed this

Ninth Day of November, 1993

Attest:

BRUCE LEHMAN

Attesting Officer

Commissioner of Patents and Trademarks